Patented June 23, 1931

1,811,264

UNITED STATES PATENT OFFICE

AUGUSTUS H. FISKE, OF PROVIDENCE, RHODE ISLAND, ASSIGNOR TO RUMFORD CHEMICAL WORKS, OF PROVIDENCE, RHODE ISLAND, A CORPORATION OF RHODE ISLAND

PREPARED FLOUR

No Drawing. Application filed March 26, 1928. Serial No. 264,972.

My present invention relates to that type of prepared flour commonly termed self-rising flour which is in general a prepared mixture of flour and a baking powder principle with salt or other flavoring adapted for instant conversion into a batter by the simple addition of water or milk.

In such flour the gas forming medium is usually a pair of reactants, one an acid salt such as phosphoric, and a base or alkaline factor usually bi-carbonate of soda, the two being non-reactive when dry but becoming active when wet up in the batter. In such flours it has been deemed ineffective to introduce any gluten modifying element on account of the presence of the acid and alkaline factors which had an action of their own on the gluten development of the dough batch.

My concept therefore involves a prepared flour which will have all of the convenience and advantage of the so-called self-rising flours, and yet have present and available a gluten improving property which will be effective even in the short time that usually elapses between the mixing of the batter and the baking of the biscuit or other product. I have found that while the two requirements of non-reactiveness in the preparation prior to use and the rapid reaction when the batter is mixed are apparently inconsistent, that nevertheless a product can be made in accordance with my invention which will give both results.

In carrying out my invention I utilize an oxidizer which while normally sufficiently stable to remain inert in the mixture will under certain conditions of the chemical reaction of the gas forming reactants become itself immediately and rapidly effective upon the gluten. I have found that this can be accomplished very simply and very effectively by causing this reaction to take place definitely on the acid side. I am able therefore by simply slightly increasing the proportion of my acid element over that neutralizing balance heretofore thought to be necessary in self-rising flours, to break down certain oxygen carriers and secure in the short period of mixing an improvement in product that is very definite and very highly desirable. For this purpose I may use a variety of materials.

For example, I may use calcium peroxide or similar peroxides which may evolve oxygen or hydrogen peroxide in a similar manner. I may use compounds made by the action of peroxides on starchy materials, as for instance my peroxidized carbohydrate formed by the action of hydrogen peroxide on starch or flour. I may use materials which contain hydrogen peroxide in a loosely connected condition, as for instance an organic addition product with urea. I may use a product in which hydrogen peroxide takes the place of water of crystallization to a greater or less extent.

Any of these oxygen or peroxide sources could be compounded in the manufacture of my self-rising flour on the basis of their available equivalent hydrogen peroxide. For a baking powder batter we need about ten times the amount of peroxide or other gluten maturing agent used in a yeast dough and developer to obtain the maximum gluten development, so I recommend 0.03% to 0.04% of the weight of the flour in terms of available hydrogen peroxide be used to give a satisfactory gluten development under the conditions usual in the mixing of such a batter. I do not confine myself to these proportions, but may use much less if the quality of the flour warrants and the proper results are obtainable. In order to judge of the necessary amount, experimental batches should be tried and from these results the proper amount to use should be determined.

I may give for example a formula for making self-rising flour using my invention as follows:

100 lbs. flour
    1½ lbs. bicarbonate of soda
    2 lbs. acid
    1¾ lbs. salt and the equivalent of approximately 0.03% of available hydrogen peroxide or 0.1 lb. calcium peroxide or urea peroxide of usual commercial strength (usually 20 to 30%).

In practice I would make up the flour by sifting it together to secure complete mixture in accordance with standard practice.

In supplying the acid to the flour manufacturer I may compound it with the oxygen carrier so that the combined product may be worked into the flour mixture without the necessity of handling the oxygen carrier as a separate material. The acid, as for example, monocalcium phosphate makes a convenient dispersion medium for the urea hydrogen peroxide or calcium peroxide and they may be mixed together with or without a small amount of starch material.

In so mixing my proportions of monocalcium phosphate to urea hydrogen peroxide or calcium peroxide would be about 20 to 1 or 200 pounds of acid to 10 pounds of peroxide or slightly less according to the strength of the peroxide as above indicated. The manufacturer of my self-rising flour would, of course, be instructed to use the slight excess of the acid mixture as above indicated.

While I have referred to my product as a self-rising flour it will be understood that I intend to include all sorts of flour mixtures for specialized purposes, such as so-called pan cake flour, cake, ginger bread or doughnut flours, and all such flour mixtures for whatever ultimate product they may be prepared where a development of the gluten is desirable.

My method of preparation may also be widely varied and the ingredients assembled together in simultaneous mixture or prepared in various combinations as may be convenient to the manufacturer and consistent with his usual sources of ingredients. All such variants and modifications in practice and in product are to be understood as within the concept of my invention which I therefore claim as follows.

What I therefore claim and desire to secure by Letters Patent is:

In a self rising flour, an acid and a basic reactant and a basic organic addition product of urea having its hydrogen peroxide combined in loosely connected crystalline relation, the acid reactant being in neutralizing amount to both basic factors involved, whereby the basic addition product releasing its hydrogen peroxide in nascent form accelerates the gluten improving rate during mixing.

In testimony whereof I affix my signature.

AUGUSTUS H. FISKE.